Nov. 17, 1959   I. W. LICHTENFELS   2,913,650
METHOD OF CONTROLLING ELECTRIC VEHICLES
Filed June 29, 1956   2 Sheets-Sheet 1

Inventor:
Ira W. Lichtenfels,
by David P. Ogden
His Attorney.

Nov. 17, 1959     I. W. LICHTENFELS     2,913,650
METHOD OF CONTROLLING ELECTRIC VEHICLES
Filed June 29, 1956     2 Sheets-Sheet 2
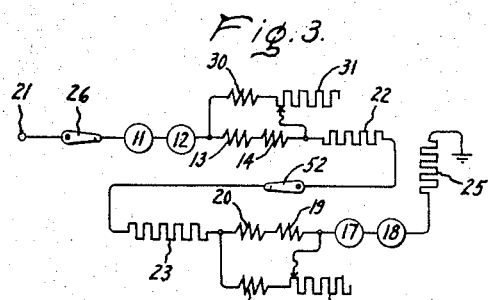
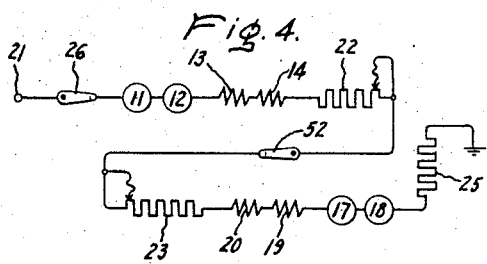
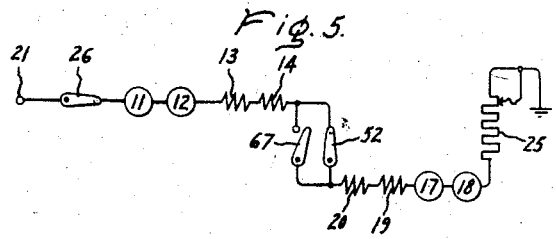
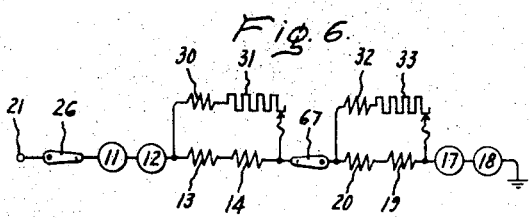
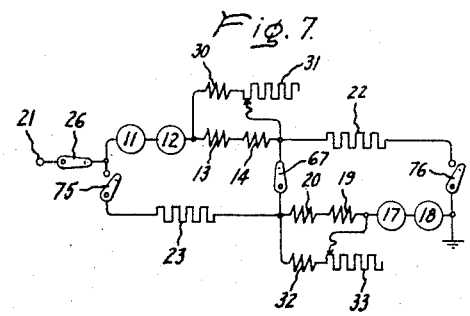
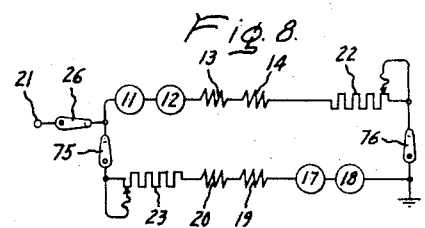
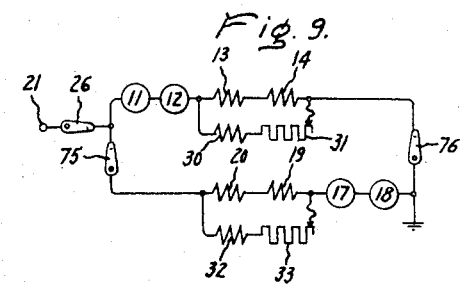
Inventor:
Ira W. Lichtenfels,
by David P. Ogle
His Attorney.

United States Patent Office 2,913,650
Patented Nov. 17, 1959

2,913,650
METHOD OF CONTROLLING ELECTRIC VEHICLES

Ira W. Lichtenfels, Erie, Pa., assignor to General Electric Company, a corporation of New York Application June 29, 1956, Serial No. 594,875

3 Claims. (Cl. 318—50)

This invention relates to methods for controlling electric motor driven railway vehicles and more particularly to a method for controlling the acceleration of traction motors of a high speed, rapid acceleration railway vehicle.

It is well known that in order to reduce the minimum overall commuting time, traction motors on rapid transit railway vehicles must be capable of driving the vehicles faster and accelerating faster to this higher speed by providing a maximum torque through more of the acceleration period. Previous equipments, operated at relatively low speeds, used a control system wherein the traction motors always were maintained in a certain connection such as a series or parallel. As the maximum speed of the vehicles is increased, it becomes impracticable to provide enough acceleration steps to provide a smooth ride and an efficient acceleration cycle while maintaining one type of power connection over the entire speed range contemplated. Several railway equipments have been designed which require both series and series parallel motor connections in the power cycle. With these equipments, the acceleration has been limited to the number of steps and is inefficient in the method of transition from series to parallel.

Therefore, an object of my invention is to provide a simple and reliable control system promoting efficient and smooth acceleration of traction motors.

A further object of my invention is to provide a control system for a rapid transit equipment having a simple, efficient and reliable method of transition from series connections, wherein the traction motor fields are shunted, to parallel operation with full field.

Briefly, in accordance with my invention in one form, power is supplied initially to the traction motors of an electric railway vehicle with all the motors connected in series, with the acceleration load resistance in the circuit to thereby limit the current, and with the field windings shunted to provide a cushioned start. During the first acceleration steps or notches, the shunt on the field windings is removed, and then the load resistors are selectively shunted from the circuit in a predetermined arrangement. At approximately 10 miles per hour, the entire load resistance is shunted from the circuit and the serially connected motors are further accelerated by again shunting the field windings. At about 15 miles per hour, further acceleration is obtained by a transition step where the motor connection is changed to a parallel connection of pairs of serially connected traction motors with load resistance in the circuit and no shunting of the field windings. Further acceleration is obtained by again shunting of the load resistors, and still further acceleration is obtained by again shunting the field windings.

The features of novelty are pointed out with particularity in the claims annexed to the concluding portion of this specification. My invention, however, both as to organization and method of operation together with further objects and advantages thereof, may best be understood by reference to the following description taken in connection with the accompanying drawings, in which:

Fig. 3 is a simplified circuit diagram illustrating the first few acceleration steps;

Fig. 4 is a simplified circuit diagram illustrating the first resistance shunting steps;

Fig. 5 is a simplified circuit diagram illustrating the first transition connection;

Fig. 6 is a simplified circuit diagram illustrating the field shunting acceleration during the series connections;

Fig. 7 is a simplified circuit diagram illustrating the transition connections;

Fig. 8 is a simplified circuit diagram illustrating the first stages of acceleration with pairs of serially connected traction motors connected in parallel branches; and Fig. 9 is a simplified circuit diagram illustrating the field shunting acceleration steps in parallel arrangement.

Figure 1:
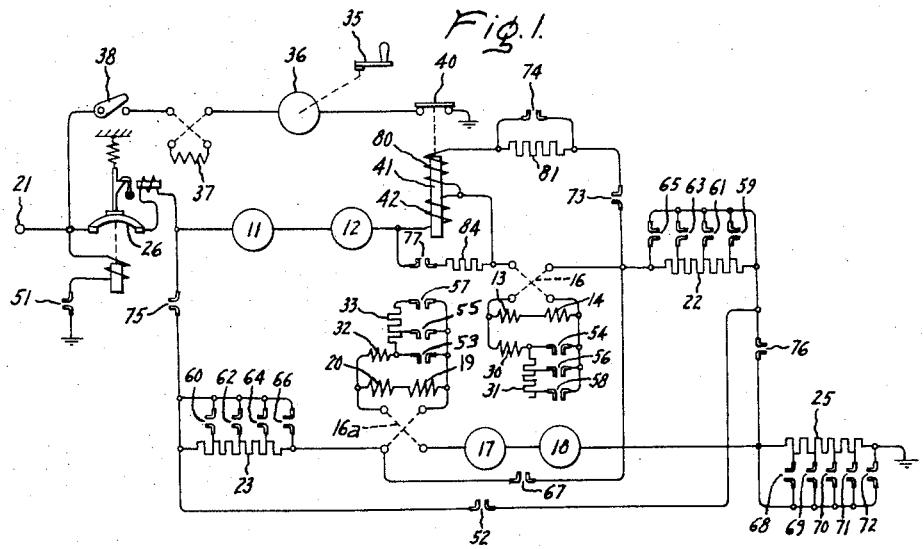
Fig. 1 illustrates a circuit diagram of one embodiment of my invention.

In Fig. 1, I have shown traction motors 11 and 12 connectable in series with their respective field windings 13 and 14 through a reversing switch 16. Similarly, the traction motors 17 and 18 are connectable in series with their respective field windings 19 and 20 through a reversing switch 16a. I prefer that the reversing switch 16 and 16a are so synchronized that the field windings of all the traction motors will promote a tractive effort in one direction.

It is well known that the effective impedance of a series motor is proportional to its speed. Uusually, rapid transit rail vehicles are energized from a power supply, schematically illustrated as a terminal 21, providing a constant voltage. Therefore, in order to limit the current flow in the traction motors at such time as the speed of the motors is not sufficient to limit the current to a reasonable value for the voltage of the circuit, I have inserted in the circuit with the traction motors 11 and 12 a load resistor 22 (Figs. 3 and 8), and I have inserted in circuit with the traction motors 17 and 18 a load resistor 23 (Figs. 3 and 8). A main load resistor 25 (Fig. 5) is shown as being connectable between the traction motors and a grounding connection. I prefer to protect the entire traction motor circuit from damaging overcurrents by connecting some well known type of safety switch or circuit breaker 26 between the power terminal 21 and the motor circuit. Of course, additional or specialized overcurrent protection devices may be required in some applications.

In order to regulate the effective impedance of the traction motors and further control the current in and tractive effort of the traction motors, each of the field windings 13, 14, 19 and 20 is provided with a variable shunt circuit. An inductance 30 and a variable resistor 31 are connectable in circuit with the field windings 13 and 14. The use of the inductance 30 is primarily to provide an inductive characteristic in the field winding shunt so that transient voltages in the power supply will not change the ratio of the shunt current to the current in the field windings. A similar inductance 32 and resistor 33 cooperate with the field windings 19 and 20 to similarly reduce the excitation of the traction motors 17 and 18 in a predetermined manner.

It should be understood that it is a usual practice in this art to have a plurality of contactors for shunting each of these variable resistors 22, 23, 25, 31 and 33 in a predetermined sequence to reduce the impedance in the circuit in a predetermined manner such as by geometric progression. However, such switching arrangements are well known in the art and their details are not a part of this invention. A simplified arrangement for shunting these resistors from the circuit is shown in Fig. 1. A more efficient switching arrangement is shown in detail in the Patent 2,131,588, issued to W. T. Gray on September 27, 1938, and assigned to the assignee of the present invention.

In Figs. 3–9, I have simply shown the variable load resistors as rheostats. The important thing to remember is that each of the impedances 22, 23, 25, 31 and 33 may be shunted from the circuit in a plurality of steps, or notches, as the train is accelerated when motoring or decelerated when braking.

Fig. 1 also illustrates a simple arrangement for automatically driving a controller 35 to make selective circuit connections (Fig. 2) for automatically accelerating the vehicle at a predetermined rate. The controller 35 is drivably connected to a controller motor 36 which is provided with a reversible field winding 37. The controller motor 36 is energized by the closing of a starting switch 38 to connect it to the power supply terminal 21.

In order to limit the current flow in the motor circuit, the other side of the controller motor 36 is grounded through a normally closed relay contact 40 of a calibration relay 41. A current sensing coil 42 is connected in the traction motor circuit in a sense which will open the contact 40 to stop the controller motor 36 at any time the impedance of the circuit is reduced to allow a predetermined maximum current flow therein. It is, of course, obvious that the calibration of this relay 41 may be adjusted to provide minimum acceleration, maximum acceleration, minimum braking, maximum braking, and often it is desirable to recalibrate the relay when the field strength is varied because of the fact that torque is affected by a reduction in field strength.

Operation

When the engineman prepares to start the train, he moves the "forward-reverse" switch 16—16a to the desired position to connect the field windings 13, 14, 19 and 20 in circuit with the traction motors. Usually this is a two position switch which is always connected in either the forward or reverse position.

To start the train from standstill, the starting switch 38 is closed by means of a lever or other means not shown to energize the controller motor 36. Energization of the controller motor 36 drives the controller 35 to the acceleration notch 1 to connect the traction motors to the power source by momentarily energizing a contactor 51 to close and latch the overload switch 26. In order to complete the connection of the traction motors in a series circuit, notch 1 also closes a series contactor 52.

The contactors 53, 54, 55, 56, 57 and 58 are also closed in notch 1 (Fig. 2) to shunt the field windings of the traction motors, thus providing a weak field and reduced torque which will allow a smooth cushioned start. Initially, I prefer to shunt the field windings to reduce the field of each of the traction motors to approximately one-third of the full field strength. In notch 1, none of the resistance of the resistors 22, 23 or 25 is shunted from the circuit. The circuit thus established is shown in Fig. 3.

Assuming that the circuit parameters are chosen to limit the circuit current in this notch well below the value which will energize the calibration relay 41 to open the contactor 40, the controller motor 36 moves the controller 35 to notch 2. This step opens the contactor 53 to increase the field current of the traction motors 17 and 18 by removing a shunt from a portion of the resistor 33. I prefer that the field strength of these motors be increased from ⅓ to ½ of its normal value in this step. This 50 percent increase in field strength, of course, increases by ½ the torque in this pair of traction motors.

As the controller motor continues to run, the controller moves to notch 3 to open a contactor 54 to increase the field strength of the traction motors 11 and 12 from ⅓ to ½. This increases the torque by ½ in these motors. As the controller moves through notches 4, 5, 6 and 7 to further reduce and finally remove the shunt on the field windings, the accelerating torque is further increased.

At some point, probably notch 1, the vehicle starts to move. As the fields and torque increase, the rate of acceleration increases. Since the field windings are primarily inductive and the increase in field strength is partially delayed by the exponential current increase in each step of shunt reduction and the voltage across the motors increases with speed, I obtain a cushioned start. Thus, the train does not start with a jerk which might be unpleasant to any passengers and damaging to any loose baggage or freight. Actually, one step of field shunting in this arrangement, with considerable impedance in the circuit, provides a smooth increase in the rate of acceleration similar to that which would be provided with several shunting steps of a load impedance if the cushioned start were not utilized.

In notch 7 contactors 53—58 are open and field shunting is eliminated from both pairs of field windings. Thus, the traction motors are now operating with full field with all the impedance of resistors 22, 23 and 25 serially connected in circuit. These circuit connections are shown in Fig. 4.

Figure 2:
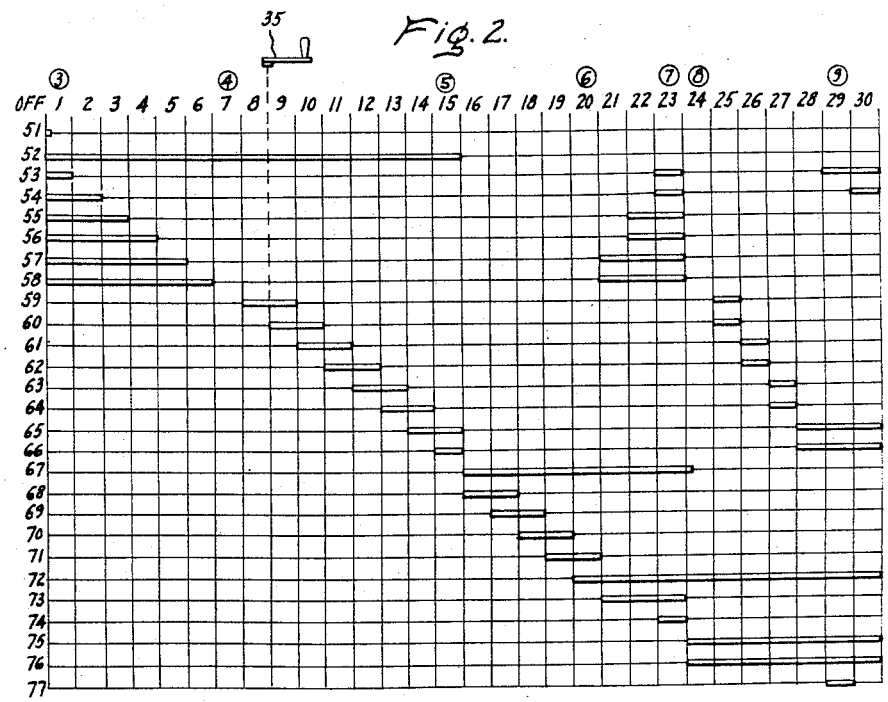
Fig. 2 is a schematic layout of a controller which will provide acceleration notches adapted to use my invention.

In order to increase the voltage across traction motors, the controller moves to notch 8 where the contactor 59 is closed to shunt a portion of the resistor 22. In notch 9 the contactor 60 is closed to shunt a portion of the resistor 23, and in notches 10, 11, 12, 13, 14 and 15 contactors 61, 62, 63, 64, 65 and 66 are closed selectively and progressively to shunt the resistors 22 and 23 from the circuit. The circuit connection with resistors 22 and 23 shunted is shown in Fig. 5, and the contactor arrangement is shown in Fig. 2 notch 15.

During some one of the notches 1–15, the acceleration will reach a desirable and preselected rate. Since the acceleration increases with an increase in torque, and the torque increases with an increase in motor current, it is a relatively simple matter to select a desired acceleration rate by predetermining the current at which the calibration relay 41 will be energized to open the contact 40 and stop the controller motor 36 to prevent further notching until the traction motors accelerate to thus limit the current. Under some conditions it is desirable to accelerate the train at a moderate rate. In this case, the calibration relay 41 may be arranged to initially stop the controller motor 36 in notch 3 or 4. However, it is usually desirable to accelerate the train at a rate which taxes the traction motors to the fullest so that the maximum acceleration is determined by the safe maximum current capacity of the traction motors. In this case, the calibration relay 41 would probably be arranged to energize initially during notch 7 or 8 to prevent excessive currents in the traction motors. Thus, assuming that the controller runs through one notch every second, it is possible to reach a maximum acceleration in eight seconds without any excessive jolt.

As the traction motors accelerate, they provide an increasing impedance to current flow by a well known phenomenon of counter electro-motive force, which will, in a few seconds after the calibration relay 41 has been energized, be increased enough by further acceleration to reduce the circuit current flow. When the current decreases to a value which will allow the relay 41 to be de-energized to return to its normal position, the contacts 40 are again closed to energize the controller motor 36. This moves the controller 35 to the next notch where the current is increased again and the calibration relay 41 is re-energized. In a few seconds the traction motors accelerate to again reduce the current, resulting in closing of the contact 40 and moving the controller 35 to the next notch. In this way, the controller progresses through the various acceleration notches intermittently and automatically.

In notch 16 the controller closes contactors 67 and 68. The closing of the contactor 67 places a direct shunt across the resistors 22 and 23 to thus shunt contactors 52 and 59—66. The closing of contactor 68 shunts a portion of the resistor 25 from the circuit to increase the motor current and accelerate the vehicle. By the time the controller 35 is automatically and intermittently driven to notch 20, all of the resistor 25 is shunted from the circuit. This circuit is shown in Fig. 6, and the contactor arrangement is shown in notch 20 of Fig. 2.

In notch 21 the controller again closes contactors 57 and 58 to shunt the field windings of the traction motors to approximately 75 percent of the normal field and to further accelerate the train. In Fig. 1, I have also shown a recalibration circuit consisting of the contactors 73 and 74, a differential relay coil 80, and a current limiting resistor 81. In order to provide an increasing torque with a reduced field strength, it is preferable to allow the armature current to increase. In the series field shunting step or notch 21, the contactor 73 is closed to recalibrate the calibration relay 41 by energizing the differential winding 80 and the series resistor 81. The operation of the recalibration in step 21 permits the running of the controller 35 until a higher armature current is reached than is permissible if the resistors 22, 23 and 25 are in the circuit. With the circuit arrangement shown in Fig. 6, the only portions of the circuit carrying this higher current are the armatures of the traction motors 11, 12, 17 and 18. This is easily seen by the fact that the resistors 22, 23 and 25 are shunted from the circuit and the field windings 13, 14, 19 and 20 are partially shunted.

In notch 22 the contactors 55 and 56 are closed to reduce the field strength to 50 percent. In notch 23 (Fig. 7) not only is all of the impedance shunted from the motor circuit but also the traction motor windings are shunted again to one-third field strength. Thus, I am able to get maximum acceleration from the series connection of the traction motors prior to transition.

I prefer to have the controller motor circuit so arranged that the controller 35 may not be stopped in notch 23. This prevents the current in the field windings from reaching equilibrium before transition is completed and allows the transition step to be an accelerating step without the danger of reducing the electromotive force of the traction motors to such a low level that the motor currents become excessive.

In order to prevent the operation of the relay 41 in notch 23, the contactor 74 is closed to shunt the current limit resistor 81. The shunting of the current limit resistor 81 causes a current to flow in the differential winding 80 of the relay 41 of sufficient magnitude to buck down the excitation of the relay coil 42. Thus, the controller will run to notch 24 (Fig. 8) regardless of the traction motor current so that transition is accomplished.

The initial stage of transition may be easily shown by reference to Figs. 2 and 5. Fig. 2 shows the preparation of the load resistors 22 and 23 for the transition step in notches 10—16 where the contactors 59—66, shunting the resistors 22 and 23, are opened as soon as they are shunted. The contactor 59 opens in notch 10 when contactor 61 is closed. This arrangement prevents the contactor 59 from opening when it is carrying the acceleration current. Similarly, the contactor 60 opens in notch 11 when the contactor 62 is closed to shunt it. In notch 12 the shunted contactor 61 is opened. Finally, in notch 16 the closing of the series contactor 67 allows the opening of the shunted contactors 52, 65 and 66. Thus, all of the resistor contactors 59—66 are opened and the resistors 22 and 23 are prepared to be inserted in the circuit as shown in Figs. 7 and 8.

In Fig. 7, I have shown the load resistors 22 and 23 and the open contactors 75 and 76. When the controller motor 36 drives the controller 35 into the transition notch 24, the contactors 75 and 76 are closed to place the resistors 22 and 23 in parallel relationship with the traction motors. The resistor 23 is connected in parallel with the traction motors 11 and 12 and the resistor 22 is connected in parallel with the traction motors 17 and 18. After these connections are completed, contactor 67 is opened to disconnect the series circuit and connect one resistor and one pair of traction motors in each of the parallel circuit branches across the power supply. This arrangement is shown in Fig. 8.

By causing a slight delay in the opening of contactor 67, I am able to provide a closed bridge circuit transition which results in no loss of acceleration during transition, as would be the case if this contactor 67 should open prior to the closing of the contactors 75 and 76. The closed bridge transition connects the resistors 22 and 23 in parallel with the pairs of traction motors. The resistors 22 and 23 are chosen to have an impedance less than that of the pairs of traction motors to provide for a slight increase in torque during the transition notch.

In transition between notch 23 and notch 24, the contactors 53—58 shunting the field windings 13, 14, 19 and 21, are opened to apply full fields to the traction motors 11, 12, 17 and 18. In determining the value of resistance to be inserted, I take into account the change in field strength created by removing the field shunt. This change in field strength increases the torque and the impedance of the motors (back electromotive force) thus allowing a much smaller load resistor than would be possible if the field strength were not reduced to be increased during the transition step.

The lower impedance of the resistors 22 and 23 causes the current in the contactor 67 to be reversed from the acceleration current of notch 23. It should also be noted that the insertion of the resistors 22 and 23 in the circuit prior to the opening of contactor 67 causes the contactor to open a resistive load instead of an inductive load which would tend to create tremendous inductive transient potential and arcing. Such arcing would undoubtedly destroy the contactor 67 and other circuit components during the first few opening operations.

In order to provide the proper torque and current limit in parallel operation, the recalibration contactors 73 and 74 are opened in notch 24 and the controller 35 will be stopped at any time the current reaches the original predetermined value. It should be noted that in order to provide the best operation of my transition arrangement, I have found the selection of the number and the value of the resistance sections of the resistors 22 and 23 requires considerable calculation. This calculation involves variables including motor characteristics and rate of acceleration desired.

With the parallel arrangement, the relay coil 42 is now only in the circuit of one pair of the traction motors 11 and 12. However, I intend, in notches 24—28, to operate the pairs of traction motors under similar conditions so that the calibration relay 41 will sense a current that is similar to the current in the other pair of traction motors 17 and 18. Thus, in the notches 25 and 26, 27 and 28, the controller 35 operates the contactors 59—66 to selectively remove each of the resistors 22 and 23 from the traction motor circuit branches with pairs of the contactors operated simultaneously to provide equal load and current distribution between the two parallel pairs of traction motors.

As the controller moves to notch 29 (Fig. 9), the traction motor field windings are again shunted to further accelerate the train. I have provided a unique arrangement for controlling the calibration relay 41. When the controller 35 moves to notch 29, contactor 53 is closed to reduce the field in the traction motors 17 and 18. However, the sensing coil 42 is in circuit with the traction motors 11 and 12. Therefore, to provide proper calibration, I partially shunt this coil 42 by closing a contactor 77 which connects a shunting resistor 84 thereacross. This arrangement lowers the current in the sensing coil 42 to provide an acceleration period in notch 29 before the controller moves to notch 30. In notch 30 the field windings of the traction motors 11 and 12 are shunted to one-third value, thus attaining maximum speed for the rail vehicle.

One feature of my invention which should be stressed is the economy of providing maximum acceleration during the series notches. By connecting all of the traction motors in series, I am able to provide one current path through the resistances of the circuit. The heat loss or inefficiency in the system is determined by the resistance, and the current therethrough. If it is necessary to limit the current in each of the motors to some value such as 100 amperes, connecting all of the motors in series allows me to not only reduce the impedance in the circuit, but also to provide only one resistance circuit which will dissipate these heat losses. If two parallel circuits were required for the entire acceleration cycle, the losses would be doubled. If each of the four traction motors were connected in parallel across the power source, the number of resistors and the losses would be quadrupled through notches 20.

In notches 21 through 23, since the acceleration is accomplished by field shunting and there are no load resistors in the circuit, the avoidable heat losses are substantially eliminated.

Also, because of the further acceleration provided by the field shunting in the series circuit in notches 21, 22 and 23, I am able to provide a much lower impedance in the parallel circuit of notches 24—27 than would be required if I did not accelerate the traction motors by field shunting. Assuming the motors accelerate from 10 to 15 miles an hour in notches 21—23, it is fairly obvious that the resistors 22 and 23 may be reduced in value to approximately half of what would be required if these steps were not utilized. This provides an added efficiency in my acceleration system, and, further, it gives the resistors 22 and 23 a change to operate under no load so that these resistors may be cooled, thus reducing current rating of the resistors 22 and 23 and the maintenance costs of the acceleration system.

It should be noted that the resistors 22 and 23 are required during both series and series parallel acceleration. This double use of the resistors 22 and 23 allows a double use of the contactors 59—66, which obviously reduces the number of parts and the initial cost of my control system. However, I prefer that the circuitry be so designed that resistor 25 is not utilized during parallel acceleration notches 24 through 31.

Of course, it is obvious that it may be desirable to provide more than 30 notches to accelerate the train from standstill to 80 miles per hour. This may be accomplished by providing more contactors or by more expeditious use of the contactors provided as shown and described in the co-pending application, Serial Number 469,184, of Charles G. Moon and myself filed November 16, 1954, and assigned to the assignee of the present application.

Assuming it is desirable to have 60 notches, I could add 11 notches by adding 3 contactors to each of the field shunting resistors. This is possible because of the fact that I use the field shunting in three portions of the acceleration cycle. Even with the simplified system shown, adding three more steps to the progressive reduction of each of the resistors 22 and 23 in the series in parallel circuits would add another 9 steps. By adding contactors and providing judicious design of the shunting circuit of the resistor 25, I could add any required number of steps without departing from the spirit of my invention.

While I have shown and described particular embodiments of my invention, further modifications and improvements may occur to those skilled in the art. For instance, it might be desirable to provide control relays in place of some of the contactors I have shown. Of course, the showing of contactors 52, 67, 73, 74, etc., as being operable by the controller 35 directly is not intended to imply that the use of relays is not feasible. However, the added circuitry required to show all of the relays contemplated would tend to unnecessarily complicate the above discussion. I desire it understood, therefore, that my invention is not limited to the form shown, and I intend by the appended claims to cover all modifications which do not depart from the true spirit and scope of my invention.

What I claim as new and desire to secure by Letters Patent of the United States is:

1. A method of operating contactors of a controller for a motor control system to accelerate electric vehicles having a plurality of traction motors with each motor having a field winding and a plurality of load resistors, including electric circuit means for connecting the motors and the resistors in a series circuit across a power source, shunting means for reducing the impedance of the resistors, other shunting means for reducing the current flow in the field windings, and other electric circuit means for connecting the motors in parallel circuit branches with at least one of the resistors in circuit with each parallel branch, comprising the steps of connecting the motors and resistors in the series circuit across a power supply with the field windings of the motors shunted to obtain a cushioned start, removing the shunt from the field windings to obtain full series excitation, shunting the resistors from the series circuit, shunting the field windings, connecting the motors in parallel with full field current, and shunting the resistors.

2. A method of operating contactors of a controller for a motor control system to accelerate electric vehicles having a plurality of serially connected pairs of traction motors with each motor having a series field winding and a plurality of load resistors including first electric circuit means including a series contactor for connecting the pairs of motors and the resistors in a series circuit across a power source, first shunting means for reducing the impedance of the resistors, second shunting means for reducing the current flow in the field windings, second electric circuit means for connecting the pairs in parallel circuit branches with at least one of the resistors in circuit with each parallel branch, and calibration means for preventing the operating of the controller when the motor current is greater than a predetermined maximum; comprising connecting the motors and the resistors in the series circuit with the field windings shunted, removing the shunt from the field windings, shunting the resistors from the series circuit, shunting the field windings to increase the maximum speed of the series connection, disconnecting the field shunts and connecting the pairs of motors in parallel, opening the series contactor, shunting the resistors, and shunting the field windings to attain maximum speed.

3. A method of accelerating dynamoelectric machines under load conditions wherein the machines have a normal excitation in relation to the load current comprising, connecting across a power supply a plurality of serially connected machines with reduced excitation currents in series with a current limiting means, progressively increasing the excitation to normal excitation, progressively reducing the effect of the current limiting means until the entire voltage of the power supply is absorbed in the machines, reducing the excitation of the machines to further accelerate the machines in the series connection, connecting the machines in parallel circuits with full excitation and serially connected current limiting means, again reducing the effect of the current limiting means, and again reducing the excitation of the machines to attain maximum speed.

References Cited in the file of this patent

UNITED STATES PATENTS

| | | |
|---|---|---|
| 2,512,381 | Riley | June 20, 1950 |
| 2,524,348 | Heidmann | Oct. 3, 1950 |
| 2,669,681 | Purifoy | Feb. 16, 1954 |

FOREIGN PATENTS

| | | |
|---|---|---|
| 10,937 | Australia | Nov. 9, 1933 |
| 474,430 | Great Britain | Nov. 1, 1937 |